United States Patent [19]

Bergh

[11] Patent Number: 4,869,592

[45] Date of Patent: Sep. 26, 1989

[54] METHOD AND APPARATUS FOR OBTAINING A DIGITAL MEASURE OF ABSOLUTE ROTATION

[76] Inventor: Ralph A. Bergh, 1441 Franks La., Menlo Park, Calif. 94015

[21] Appl. No.: 149,140

[22] Filed: Jan. 27, 1988

[51] Int. Cl.[4] .............................................. G01B 9/02
[52] U.S. Cl. .................................................... 356/350
[58] Field of Search ........................................ 356/350

[56] References Cited

FOREIGN PATENT DOCUMENTS 2123163  1/1983  Fed. Rep. of Germany ...... 356/350

OTHER PUBLICATIONS

"Sensitive Fiber-Optic Gyroscopes", Physics Today, 10-1981, pp. 20-22.

Primary Examiner—Vincent P. MaGraw
Assistant Examiner—S. A. Turner
Attorney, Agent, or Firm—Cushman, Darby & Cushman

[57] ABSTRACT

In a closed loop fiber optic gyroscope, the counter-propagating lightwaves are phase modulated by a triangular wave modulation with the triangular wave skewed to lock the phase difference between the counter-propagating waves alternately to specific values of phase difference which are greater than and less than the phase difference due to rotation. The difference in elapsed time between the up-slope and down-slope portions of the triangular wave modulation yields a measure of rotation angle, whereas such difference in elapsed time divided by total elapsed time yields a measure of rotation rate. The phase difference is further modulated about the locked values at a higher frequency, such higher frequency phase difference modulation being synchronously detected to produce a rotation rate signal component employed to generate the skewed triangular wave. Various other features are employed to light polarization errors.

44 Claims, 3 Drawing Sheets

METHOD AND APPARATUS FOR OBTAINING A DIGITAL MEASURE OF ABSOLUTE ROTATION

BACKGROUND OF THE INVENTION

The present invention relates, in general, to gyroscopes and, more particularly, to closed loop fiber optic gyroscopes.

DESCRIPTION OF THE PRIOR ART

Heretofore, closed loop fiber optic gyroscopes have been made using integrated optics. In these prior gyroscopes, a light source sends light to a beam splitter which splits the beam into two waves which counter-propagate around a fiber optic coil and recombine on the beam splitter. A phase modulator is placed off-center in the fiber optic coil to phase modulate the counter-propagating waves to assist in processing the signals. The combined counter-propagated lightwaves are detected by a power detector to obtain a raised cosine output as a function of phase difference between the counter-propagated waves (Sagnac interferometer effect). Rotation of the fiber loop about its axis of revolution produces a phase difference in the combined waves which is detected to derive an output determinative of rotation.

Greatly improved performance is obtained by providing closed loop operation which applies a feedback phase shift to the counter-propagating waves to bring back the system to a zero operating point. The amount of feedback necessary to cancel the error signal then becomes a measure of the rotation rate.

Examples of prior art closed loop fiber optic gyroscopes are found in the following references: U.S. Pat. No. 4,687,330 issued Aug. 18, 1987 and an article titled: "INTEGRATED OPTICS: A PRACTICAL SOLUTION FOR THE FIBER-OPTIC GYROSCOPE" appearing in SPIE Vol. 719 Fiber Optic Gyros: 10th Anniversary Conference (1986) pgs. 101–112.

In the case of U.S. Pat. No. 4,687,330, the closed loop feedback system relies upon a second harmonic phase modulation of the counter-propagating waves and the gyro suffers from an inaccurate scale factor due to the inability to measure the amplitude of the second harmonic feedback signal with sufficient accuracy.

In the case of the closed loop gyro described in the aforecited SPIE article, the feedback system employs a repetitive digital phase ramp to lock the system to zero and the reset points of the digital phase ramp are counted to yield the measure of rotation.

SUMMARY OF THE PRESENT INVENTION

The principal object of the present invention is the provision of an improved closed loop fiber optic gyroscope.

In one feature of the present invention, a fiber optic gyro is servo controlled to lock the phase difference alternately to specific values which are greater than and less than the phase difference due to rotation and synchronizing the transitions between the two locked values of phase difference to discrete time intervals. Such two specific values are preferably provided by a triangular wave phase modulation feedback signal with the triangular wave being skewed so as to offset rotation-induced phase shifts.

In another feature of the present invention, the difference in time spent on the up-slope and down-slope portions of the skewed triangular wave of phase modulation is measured to yield a measure of rotation.

In another feature of the present invention, a second, higher frequency, lower amplitude phase difference modulation of the counter-propagating lightwaves is employed to assist in processing of the signals derived from the counter-propagating waves in the fiber optic loop.

In another feature of the present invention, the second higher frequency and lower amplitude phase difference modulation has an amplitude less than $\pi/5$ radians.

In another feature of the present invention, both the transitions of the triangular wave modulation and the second phase difference modulation signals are synchronized.

In another feature of the present invention, the modulation frequency, $f_m$, of the second phase modulation signal is determined from the relationship:

$$f_m = \frac{(2n-1)}{2 T_L}$$

where n is a positive integer and $T_L$ is the lightwave propagation time around the fiber loop.

In another feature of the present invention, the principal axis of the accompanying birefringence modulation due to the triangular wave phase modulator is aligned with the polarization of the lightwaves which pass into the fiber loop to the triangular wave modulator, whereby errors caused by imperfection of the light polarizer are reduced.

In another feature of the present invention, the amplitude of the accompanying birefringence modulation introduced by the triangular wave modulator is adjusted to be an integer multiple of a half wavelength of the counter-propagating lightwave.

In another feature of the present invention, the fringes of the raised cosine interferometer output are counted during the transitions between slopes of the triangular wave phase modulation to determine the scaling factors for the respective slopes of the triangular wave modulation.

Other features and advantages of the present invention will become apparent upon a perusal of the following specification taken in connection with the accompanying drawings wherein:

DESCRIPTION OF THE PREFERRED EMBODIMENTS

Figure 1:
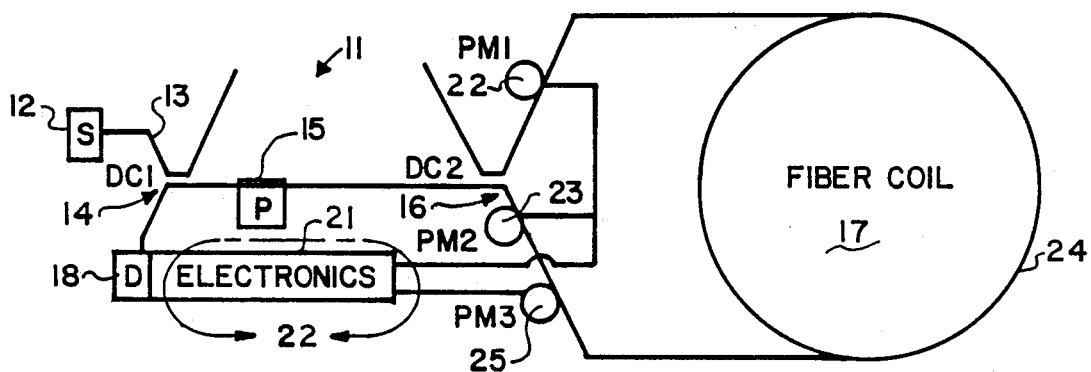
FIG. 1 is a schematic line diagram of a closed loop fiber gyro of the present invention.

Referring now to FIG. 1, there is shown a closed loop fiber gyroscope 11 incorporating features of the present invention. The basic gyro 11 is similar to that disclosed in the aforecited U.S. Pat. No. 4,687,330, the disclosure of which is hereby incorporated by reference in its entirety.

Figure 3:
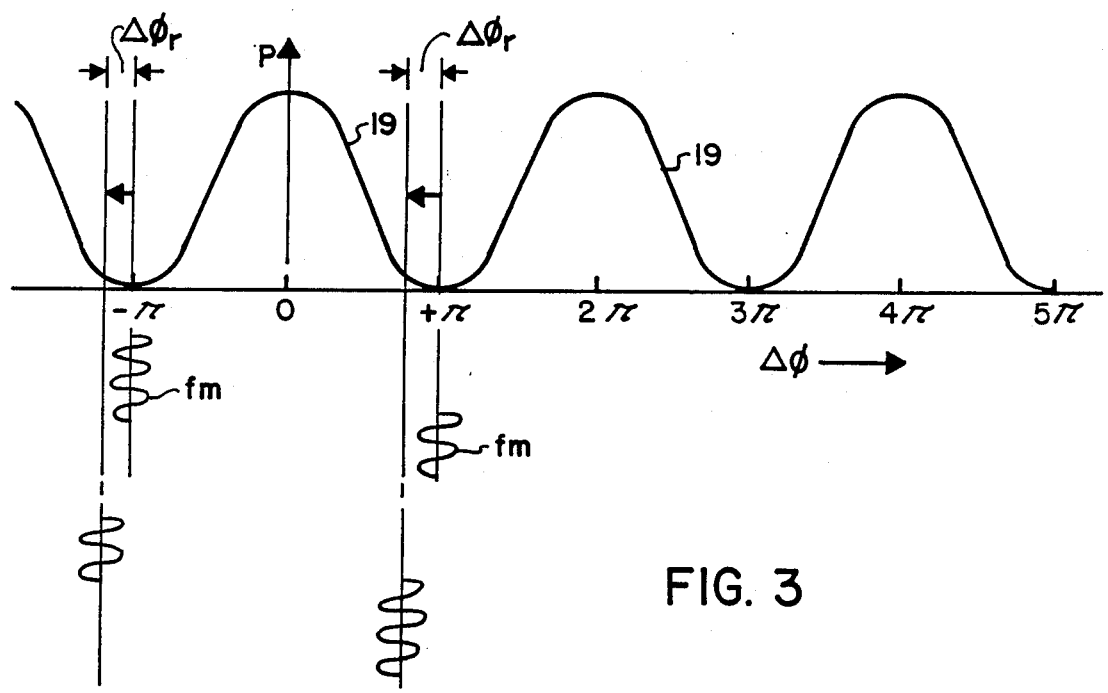
FIG. 3 is a Sagnac interferogram depicting the power output versus phase difference $\Delta\phi$ of the combined counter-propagating waves of the fiber loop of FIG. 1.

Briefly, the gyroscope 11 includes a light source 12, such as a diode laser pumped Nd:YAG or Nd:glass laser, laser diode, or superluminescent diode having a light output of a wavelength of 1.3 μm, 1.06 μm, or 0.8 μm. The light from the source 12 is directed into the end of a fiber optic waveguide 13 which in-turn feeds the light into a directional coupler 14, such as Model FC, commercially available from Canadian Instrumentation and Research Limited of Mississauga, Ontario, Canada. An output of the directional coupler 14 is coupled into a linear polarizer 15 such as that disclosed in U.S. Pat. No. 4,386,822, issued June 7, 1983, the disclosure of which is hereby incorporated by reference. The polarized output light is thence fed into a second directional coupler 16 where the power is split and one-half applied to one end of the fiber coil 17 and the other half is applied to the other end of the fiber coil 17. The two lightwaves counter-propagate around the fiber coil 17, as of 1 kilometer long. After passage around the fiber loop 17 in opposite directions, the two counter-propagating lightwaves are combined in the directional coupler 16 and are fed back through the polarizer 15 and directional coupler 14 to a power detector 18 to produce a raised cosine signal 19, as shown in FIG. 3. The raised cosine signal 19 has maxima at even integer values, including zero, of $\pi$ radians phase difference $\Delta\Phi$ between the phase of the combined counter-propagated lightwaves and minima at odd values of $\pi$ radians phase difference.

The output of the detector 18 is fed into a system of electronics 21, more fully described below with regard to FIG. 2, which produces a triangular wave feedback signal fed to a pair of push-pull phase modulators 22 and 23 symmetrically placed relative to the center 24 of the fiber coil 17, and proximate the ends of the fiber coil 17. Also, the electronics 21 outputs to a third phase modulator 25, which is asymmetrically disposed proximate one end of the fiber coil 17, a second phase modulation signal of a frequency $f_m$ higher and of lower amplitude than the triangular wave signal fed to the modulators 22 and 23.

Alternatively, a single phase modulator, disposed proximate one end of the fiber loop 17, could be used to apply both the triangular wave phase modulation and the second phase modulation signal.

Figure 2:
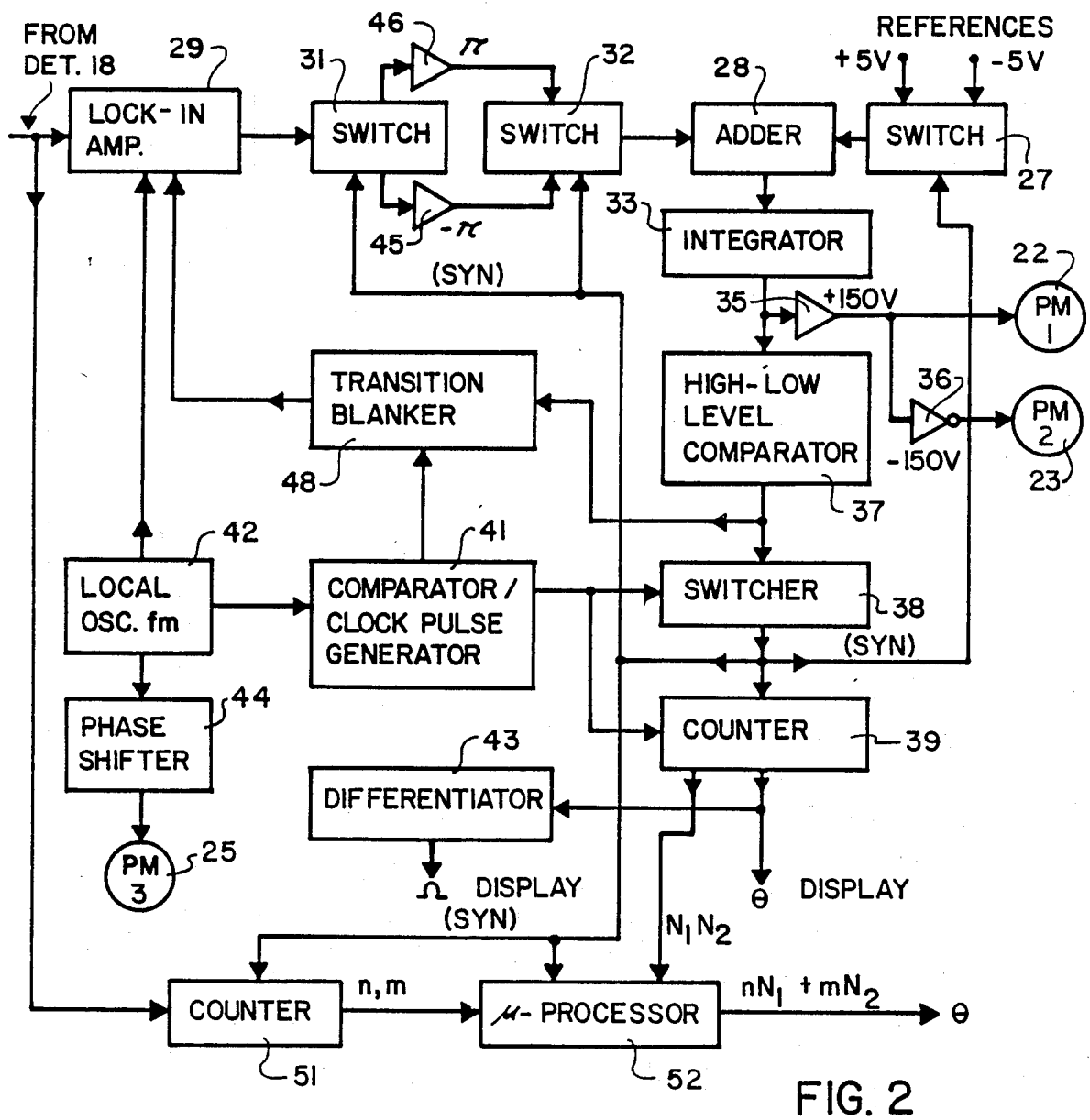
FIG. 2 is a schematic diagram, in block diagram form, of the electronic portion of the apparatus of FIG. 1 delineated by line 2—2.

Referring now to FIG. 2, the electronics 21 is shown in greater detail. The gyro 11 is locked by means of the feedback triangular wave to $+\pi$ and $-\pi$ radians of phase difference of the cosine output, see FIG. 3. This is accomplished by sequentially switching, via switch 27, a positive and negative reference voltage as of $\pm 5$ V, into one input of an adder 28 for adding to the output of a lock-in amplifier 29 synchronously switched into the adder 28 via switches 31 and 32.

For the sake of ease of explanation, it will be assumed that there is no rotation and that with no rotation the output from lock-in amplifier 29 is zero. Thus, in the absence of rotation, the output of the adder 28 is switched between the positive and negative reference voltages. The output of the adder 28 is integrated in integrator 33 to produce a triangular wave output signal of the type shown at 34 of FIG. 4. The triangular wave output 34 is amplified by buffer amplifier 35 as of $-150$ V and thence fed to the phase modulator 22. A second portion of the amplified triangular output 34 is inverted by inverter 36 and fed to the second phase modulator 23. The two triangular waves are complementary waves, i.e., of equal amplitude and opposite sign.

The time constant of the integrator 33 and the values of the reference voltages are selected so that the rate of change or slope of the positive and negative sloping portions of the triangular wave are of the correct value to switch the phase difference $\Delta\Phi$ of the resultant raised cosine signal 19 between $\Delta\Phi$ difference values alternately greater than and less than the phase difference value $\Delta\Phi_r$ due to rotation.

In the case of low values of rotation, i.e., $\Delta\Phi_r$ less than $\pi$ radians, the aforementioned time constants and reference voltage levels are chosen to switch the $\Delta\Phi$ value alternately to $+\pi$ and $-\pi$ radians, respectively, as shown by waveform 19 of FIG. 3. While $\pm\pi$ are preferred operating values of $\Delta\Phi$ for low rotation rates, other values of $\Delta\Phi$ are also useful as operating values, such as $\pm\pi/2$ radians, odd integral numbers of $\pm\pi$ radians, etc.

The slope of the triangular wave modulation is related to $\Delta\Phi$ by the following expression:

$$\Delta\phi(t) \simeq \frac{d\phi}{dt} T_L$$

where $\Phi$ is the phasemodulation applied to a single phase modulator and in the case of push-pull phase modulation $\Phi = \Phi_1 - \Phi_2$.

The triangular wave output from the integrator 33 is fed to a high and low level comparator 37 for comparison with respective low and high reference levels to derive an output when the triangular wave reaches respective high and low reference levels as determined by reference inputs. The reference levels are set to define the peak values of the triangular wave.

The output of the comparator 37 drives a switcher 38 which outputs a signal whenever the triangular wave hits one of the reference levels of the comparator 37. One output of the switcher 38 synchronizes the switch 27 for switching the reference voltages into the adder 28. Another output of the switcher 38 is fed to up-down counter 39 which counts up during the positive slope of the triangular wave 34 and counts down during the negative slope of the triangular wave 34. The counter 39 is supplied with count pulses from a comparator/clock-pulse generator 41 which generates pulses synchronized with the output frequency $f_m$ of a local oscillator 42, as of 100 kHz. The clock-pulse generator 41 also supplies a synchronizing pulse to the switcher 38 such that the switcher 38 will only provide an output synchronized with an integral number of clock pulses.

The output of the up-down counter 39, after each triangle wave cycle, is a measure of rotation angle $\theta$. A portion of the rotation angle output $\theta$ is fed to a differentiator 43 to derive an output $\Omega$. Which is a measure of rotation rate $\Omega$.

Thus, in the absence of rotation, the output of the integrator 33 is a triangular wave 34 of equal and opposite positive and negative slope portions of equal elapsed time. Thus, the output of the up-down counter is zero representative of zero rotation. The operating points on the raised cosine output 19 alternate back-and-forth between phase nulls at $-\pi$ and $+\pi$ radians, see FIG. 3.

As an aid to rotation detection, the local oscillator frequency $f_m$ is selected to have a value related to the counter-propagating wave transit time $T_L$ around the fiber loop 17 by the following relation:

$$f_m \simeq \frac{(2n-1)}{2T_L}$$

where n is a positive integer. When the phase of the counter-propagating waves is modulated at $f_m$, there results a $\Delta\Phi$ modulation component at the modulation frequency $f_m$ centered about the respective phase difference operating point, lock value, for example, $+\pi$ and $-\pi$ radians (See FIG. 3.). This $f_m$ phase modulation of $\Delta\Phi$ is generally of a frequency $f_m$ higher than the frequency of the triangular wave modulation, i.e., 100 KHz versus 100 Hz for the triangular wave frequency.

One sinusoidal output of the local oscillator 42 at $f_m$ is fed to phase modulator 25 via variable phase shifter 44 and another output of the local oscillator 42 at $f_m$ is fed to the lock-in amplifier 29 for synchronous detection of the $f_m$ component in the output of the detector 18. In the absence of rotation, and when locked to $\Delta\Phi$ phase null values of $-\pi$ and $+\pi$ radians, respectively, the fundamental frequency component at $f_m$ in the output of the detector 18 is of zero value (phase null), whereas the second harmonic of the modulation frequency $f_m$ is of maximum amplitude. Thus, the output of the lock-in amplifier 29 and the signal input to the adder 28 is of zero value giving the aforedescribed triangular wave output with equal elapsed times in the up-slope and down-slope portions. Thus, the outputs $\theta$ and $\Omega$ are of zero value.

However, when rotation exists, there is a rotation induced component of $\Delta\Phi$, namely, $\Delta\Phi_r$, which attempts to shift the operating points of $-\pi$ and $+\pi$ radians either toward the $+$ or $-\Delta\Phi$ directions determined by the sign of rotation and by an amount $\Delta\Phi_r$ determined by the rate of rotation, as shown in FIG. 3. Any attempted shift in the operating point in the phase null values of $-\pi$ and $+\pi$ radians of $\Delta\Phi$ result in producing rotation frequency components at odd harmonics of $f_m$ including $f_m$ in the detected raised cosine signal 19 at the output of detector 18. In a preferred embodiment, the rotation frequency component at the frequency of the phase difference modulation $f_m$ is synchronously detected and amplified by the lock-in amplifier 29 to produce a d.c. error signal of a sign dependent on the direction of the rotation. This d.c. error rotation signal is additionally amplified by respective amplifiers 45 and 46 or proportional, integrating and differentiating (PID) controllers 45 and 46 and synchronously switched by switches 31 and 32 into the input of the adder 28.

Although, in a preferred embodiment with phase difference lock at $\pm\pi$ radians, the rotation induced harmonic components of $f_m$ are odd integer numbers n of $f_m$ including n=1, if phase lock is at $\pm\pi/2$ radians, this corresponds to a null of the even harmonics of $f_m$. In this latter case, the second harmonic of $f_m$ could be used to detect rotation.

The sign of the error d.c. signal is fed to the adder 28 is chosen so that if rotation is in the negative $\Delta\Phi$ direction, the error signal is negative during the positive slope portion of the triangular wave to reduce the amplitude of the output of the adder 28 by the amount of the error signal to reduce the slope of the resultant positive slope portion of the triangular wave 34 by an amount to cancel $\Delta\Phi_r$ and retain lock on the $+\pi$ value of $\Delta\Phi$, thereby producing an increase in the elapsed time of the triangular wave to reach the pre-determined high peak level value of the high-low comparator 37. The reduced positive slope of the up-slope portion of the skewed triangular wave is just sufficient to lock to the $+\pi$ radian value of $\Delta\Phi$.

During a negative slope portion of the triangular wave, the negative d.c. error signal is added to the negative reference voltage to produce a resultant negative voltage output of the adder 28 which is more negative than the reference voltage by the value of the d.c. error signal. This increases the slope of the down-slope portion of the triangular wave sufficiently to lock $\Delta\Phi$ to the $-\pi$ radian value and reduces the elapsed time to reach the low reference value of the high-low comparator 37.

Figure 5:
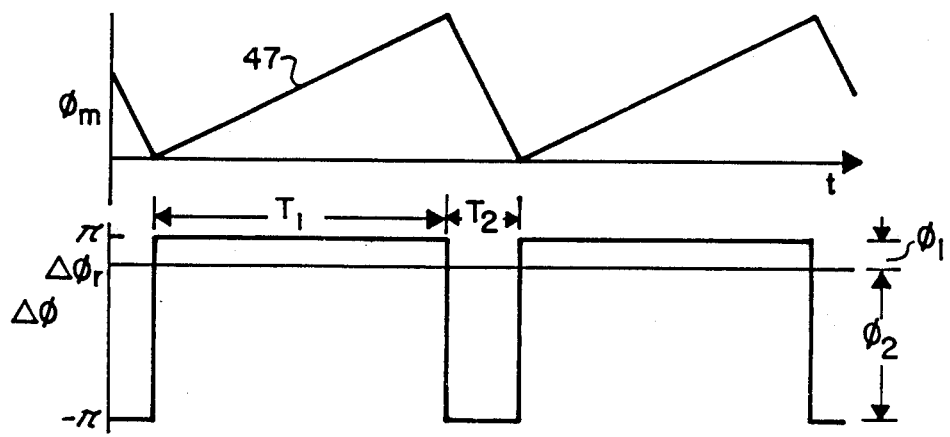
FIG. 5 is a plot similar to that of FIG. 4 depicting the conditions for rotation of the fiber loop.

The result is a skewed triangular wave as shown at 47 in FIG. 5. The up-down counter 39 measures the difference in elapsed time between the up-slope and down-slope portions of the skewed triangular wave 47 to yield a digital output which is a measure of rotation angle $\theta$. This output is divided by the total elapsed time in the differentiator 43 to yield a digital measure of rotation rate $\Omega$.

A transition blanker 48, such as a one-shot multivibrator responsive to the transition outputs of the high and low level comparator 37 and the clock-pulse generator 41, generates a transition blanking signal fed to a gate in the lock-in amplifier 29 for blanking out output during the transitions of the triangular wave from one slope to another so as to reduce errors associated with the transients associated with the transitions.

Although a preferred embodiment of the present invention utilizes locking of the phase difference $\Delta\Phi$, values to $+\pi$ and $-\pi$ radians, this is not a requirement. Other odd or even integer numbers of $\pi$ radian phase difference values may also be employed. An odd integer number of $\pi$ radian $\Delta\Phi$ values are preferred because these values correspond to null values of the raised cosine signal and signal detection is more accurate at a null. Also, odd integer numbers of $\pi/2$ radian values of $\Delta\Phi$ may be employed as the locking values.

Also, the amplitudes of the phase shift of the lightwaves produced by the triangular wave modulators 22 and 23 is preferably relatively large, i.e., greater than 20 $\pi$ radians and in a typical example is 100 $\pi$ radians when using fiber optic phase modulators.

On the other hand, and especially when operating on a locked phase difference $\Delta\Phi$ corresponding to odd integer number of $\pi$ radians, the amplitude of the sinusoidal phase modulation at the modulation frequency $f_m$ is relatively low, i.e., has a peak value less than $\pi/5$ radians and preferably less than $\pi/20$ radians.

Reducing the magnitude of the sinusoidal phase modulation, $f_m$, used to dynamically bias the gyro affects the system in three ways. First, it reduces the relative amplitude of spurious signals incident on the detector 18 at frequencies other than the desired frequency of modulation, $f_m$. Second, it reduces the light power returned to the source 12 by remaining close to the null, and, thus, helps to isolate the source 12. Third, it reduces the photon noise.

THEORY OF OPERATION

Figure 4:
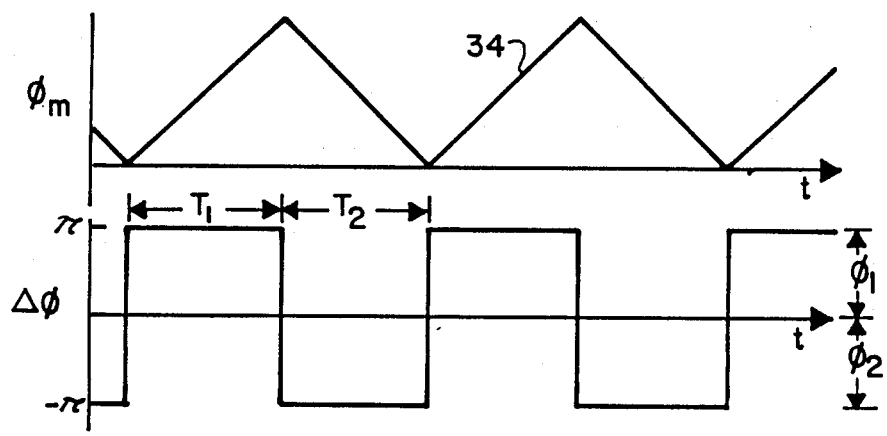
FIG. 4 is a plot of waveforms of phase modulation and resultant phase difference modulation for the gyroscope of FIG. 1 and depicting phase lock at $\pi$ and $-\pi$ values of phase difference

In summary, low frequency triangle wave signals applied to the phase modulators 22 and 23 create a near-square wave modulation of the phase difference, see FIGS. 4 and 5. Thus, the phase difference alternates back-and-forth from a value greater than to a value less than that due to rotation. These values are independently adjusted by adjusting the slopes of the legs of the triangle wave. The optical power P incident on the detector 18 varies as a raised cosine function of these phase shifts. Thus, feedback from the output is used to adjust the slopes of the triangle wave in order to lock the phase difference alternately to two particular values. For example, for small rotation rates the phase difference can be locked alternately to plus and minus $\pi$ radians. When the gyro is not rotating, the triangle wave is symmetrical, shifting the phase difference exactly $\pi$ up and down, see FIG. 4. A non-zero rotation rate, however, requires the wave to become skewed as the slopes are adjusted independently to shift the phase difference more in one direction than the other in order to compensate for the rotation rate induced phase difference, and keep the total phase difference locked to plus and minus $\pi$ radians, see FIG. 5. The rotation rate can be determined by the relative time spent on the two legs of the triangle wave. To understand this, we note that we have two measurements for the rotation rate induced phase difference, one with respect to plus $\pi$ and one with respect to minus $\pi$. These measurements are in the form of slopes, which may be thought of in terms of an amplitude divided by the time sloping up in one case and the time sloping down in the other. The amplitude cannot be measured with sufficient precision, but since the amplitude up is the same as the amplitude down, it can be eliminated by comparing the two measurements. Unlike the amplitude, the time can be measured precisely, giving a precise measurement of the rotation rate induced phase difference. Assuming a precise relationship between this phase shift and the rotation rate, yields precise knowledge of the latter.

ROTATION-RATE MEASUREMENT

The expression for the rotation-rate induced phase difference, $\Delta\Phi_r$ is:

$$\Delta\Phi_r = \pi(T_1 - T_2)/(T_1 + T_2)$$

where $T_1$ and $T_2$ are the times spent on the up and down legs of the triangle wave. Putting this in terms of rotation rate, $\Omega$, we have $$\Omega = \lambda c(T_1 - T_2)\, 4LR(T_1 + T_2)$$

where $\lambda$ is the vacuum wavelength of the light, C is the vacuum speed of light, L is length of the fiber in the coil 17 and R is the radius of the coil 17.

ROTATION-ANGLE MEASUREMENT

Multiplying this expression by the total time, which is given by $T = T_1 + T_2$, an expression for the angle $\theta$, through which the system has rotated is obtained:

$$\theta = (T_1 - T_2)\lambda c/4LR$$

DIGITIZING

The above expression is digitized in terms of the clock time $T_c$ by using the identities $T_1 = N_1 T_c$ and $T_2 = N_2 T_c$, where $N_1$ and $N_2$ are integers. By doing so, the transitions of the triangular wave occur at discrete intervals. It is important to note, however, that the slopes of the legs of the triangle wave are unconstrained by digitizing, and as before, are solely determined by the points to which the phase difference is locked. As a consequence, the triangle wave does not return after each cycle to the same peak value. The value of the peak of the triangle wave contains information that is transferred from one cycle to another. A very small rotation rate, which does not skew the triangle wave enough to cause a count after one cycle, will cause a count after a number of cycles. Using also the identity $\Delta N = N_1 - N_2$, we obtain $$\theta = \Delta N\, T_c \lambda c/4LR$$

In this form, the system is a digital rate-integrating gyroscope.

EXTENDING DYNAMIC RANGE

Rotation rates greater than $\pi$ or less than minus $\pi$ radians can be measured accurately by changing the values on the raised cosine curve to which the system is locked. If the system is locked to minima of the raised cosine curve, the formula for the rotating-rate induced phase difference can be expressed as:

$$\Delta\Phi_r = \pi(nT_1 + mT_2)/T_1 + T_2)$$

where n and m are odd integers and $n\pi$ and $m\pi$ are the phase differences to which the system is locked. The case of $n=1$ and $m=-1$ is treated above. The analagous digital rate-integrating gyro output is:

$$\theta = (nN_1 + mN_2)\, T_c \lambda c/4LR$$

The values of n and m are determined by counting the fringes (peaks and/or valleys of the raised cosine signal 19) during transitions of the slopes of the triangle wave. This fringe counting is achieved in the circuit of FIG. 2 by feeding the detected signal to a counter 51 and counting the fringe during the transitions between slopes of the triangular wave modulation to derive n and m counts. These counts are fed to a microprocessor 52 and multiplied with the respective accumulated counts $N_1$ and $N_2$ derived from the counter 39 to obtain outputs $nN_1$ and $mN_2$ which are then added together to obtain the output $\theta$.

COMPLEMENTARY TRIANGLE-WAVE MODULATION

The use of two phase modulators 22 and 23, one at each end of the loop 17, driven by complementary triangle waves has advantages. One advantage is that transitions from up to down slope and down to up slope are more symmetrical. Symmetry is important because the amplitude of the down slope is ideally the same as the amplitude of the up slope. Symmetrical transitions are helpful to system accuracy.

DYNAMIC BIAS

The dynamic bias scheme (modulation of phase at $f_m$), described above, serves to dynamically bias the system about the minima of the raised cosine, and also serves as the clock. The amplitude of the signal at the bias modulation frequency reveals the deviation of the phase difference from plus or minus $\pi$. The feedback electronics null this amplitude by correcting the error in the phase difference. The same phase modulator 25 can be used to create the phase modulation for the dynamic bias as for the triangle wave. However, in a preferred embodiment, separate modulators 25 and 22 and 23 will work better since the amplitudes of the two waves differ by orders of magnitude.

INPUT COUPLING

The low optical power requirement of the gyro of FIG. 1 allows liberties to be taken with the input coupling. Adjusting the first coupler 14 to reduce the amount of power transferred from the source 12 to the sensing loop 17, reduces also the amount transferred back from the sensing loop 17 to source 12, thereby delivering a greater fraction of the light in the fiber loop 17 to the detector 18. This isolates the source 12 from the light returned by the interferometer without substantially reducing the power incident on the detector 18. Reducing the total power on the detector 18 by only about a factor of two, serves to reduce the light returned to the source 12 by more than an order of magnitude. Furthermore, more efficient use is made of the power in the loop 17, increasing the signal with respect to an optical Kerr effect induced error. An additional advantage to reduced input coupling is that a greater fraction of the source power is available for other purposes.

For example, many gyros 11 may be powered by the same source 12. This will reduce the cost, or allow for the use of a more expensive source 12 in, say, an inertial navigation system. It also ensures that the light wavelength is identical in all of the multiplexed gyros. This means that a variation of wavelength would not result in a spurious reading of the direction of the rotation vector in a three axis system, but only affect the measurement of its magnitude.

FREQUENCY SHIFTING, RAYLEIGH BACKSCATTERING AND LASER SOURCES

The triangle wave phase modulation shifts the frequency of the propagating waves. An expanding phase modulator (piezoelectric) down shifts the frequency, whereas a contracting phase modulator up shifts the frequency. The phase modulator alternately up shifts and down shifts the frequency of the waves propagating around the loop. In the case of one triangle wave phase modulator on one side of the loop 17, one wave is not frequency shifted until it leaves the loop 17 and the other is frequency shifted upon entering. Both waves leave the loop 17 with the same frequency, alternately shifted by plus and minus $f_t$. The Rayleigh backscattered waves exit the loop 17 at different frequencies, either unshifted, having not passed through the triangle wave modulator, or doubly shifted, i.e., plus or minus $2f_t$, having passed through the modulator twice. As a result, the backscattered waves will not interfere with the signal waves or with each other. This reduces significantly their contribution to the noise in the system opening the way for use of narrow band sources, such as single-mode and few-mode lasers 12. If two complementary phase modulators 22 and 23 are used, the two signal waves exit the loop unshifted, and one backscattered wave exits shifted by plus then minus $f_t$ while the other exits shifted minus then plus $f_t$. Again, the backscattered waves do not interfere with the signal waves or with each other. In the case of locking to plus and minus $\pi$ radians, $f_t$ equals plus and minus $\frac{1}{2} T_L$ hertz where $T_L$ is the transit time around the loop 17. This latter case could produce interference with the second modulation signal $f_m$ if $f_m$ is $1/(2T_L)$. Therefore, $f_m$ is preferably chosen as $\simeq 3/(2T_L)$.

POLARIZATION ERRORS

A rotation-rate error can occur as a result of an imperfect polarizer 15. A small fraction of light survives passing through the attenuating axis of the polarizer 15. This light is then mixed with the light in the other polarization when they both pass back through the polarizer 15 while exiting the interferometer. This can cause a phase error between the counter-propagating waves due to the non-reciprocal path of the originally attenuated polarization. The phase error is proportional to the amplitude extinction ratio of the polarizer 15, and, as a result, can be sizeable even with a very good polarizer 15. See an article titled: "Phase error bounds of fibre gyro with imperfect polarizer/depolarizer" Electron. Lett. 20, 330-332 (1984).

Phase modulators often induce accompanying birefringence modulation with modulation of the phase. Piezoelectric tube-type phase modulators induce about 1 to 0.01 percent accompanying birefringence modulation with respect to phase modulation.

Referring again to FIG. 1, the principal axes of birefringence modulations from the two modulators 22 and 23 are aligned with the principal axes of the polarizer 15. This is likely to be the case if the symmetry axis of the piezoelectric tube is aligned with the polarizer 15. The amplitude of the triangle wave is selected to effect a birefringence modulation $\Delta\beta_m L_m$ peak-to-peak of approximately $p\pi$ in each of the two complementary triangle wave phase modulators 22 and 23, where p is an integer, $\Delta\beta_m$ is the modulation of the difference between the propagation constants of the two different polarizations, and $L_m$ is the length of fiber modulated. Setting the birefringence modulation amplitude sets also the amplitude of the phase modulation which has been unconstrained in the above description. Thus, the phase of the light that passes through the attenuating axis of the polarizer is modulated with respect to the non-attenuated waves. This averages the interference between the two as a function of their phase difference and reduces the error.

TRIANGULAR PHASE MODULATION

Figure 6:
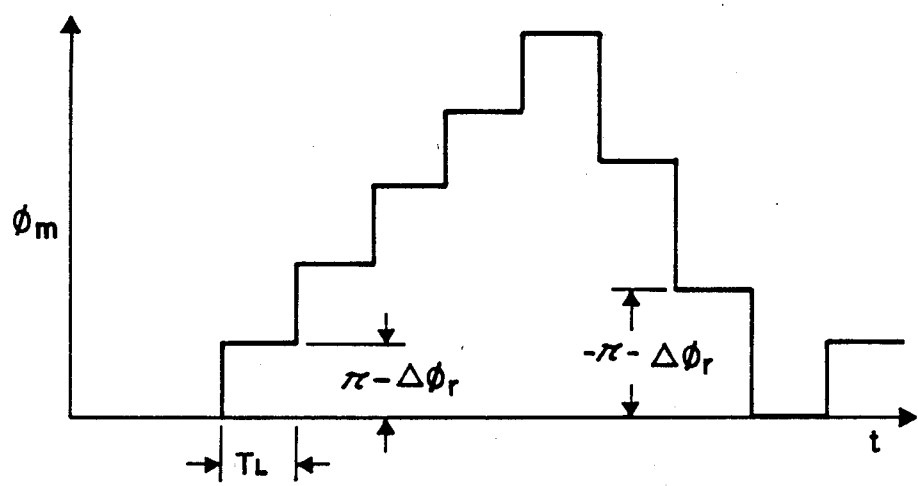
FIG. 6 is a plot similar to that of FIG. 5 depicting an alternative stair-case phase modulation.
Figure 6:
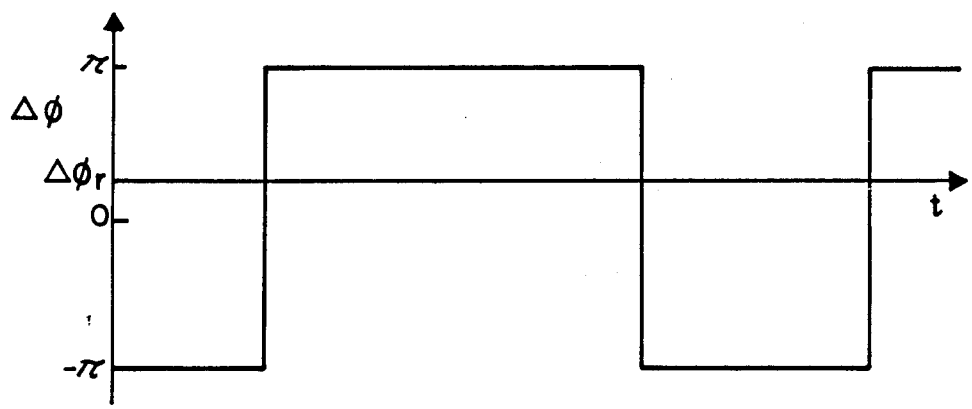

As thus far described, the gyro 11 of the present invention has employed triangular wave phase modulation in modulators 22 and 23. This is not a requirement to shift the phase difference $\Delta\Phi$ between the desired operating points or values such as $+\pi$ and $-\pi$ radians of $\Phi$. Alternatively, in case of a wide band phase modulator 22 and 23, such as used in integrated optics, triangular stair-case wave phase modulation may be employed with steps $T_L$ wide and $\Delta\Phi_r$ high for the up-slope and $T_L$ wide and $-\pi - \Delta\Phi_r$ high for the down-slope, see FIG. 6. Triangular wave phase modulation, as used herein is hereby defined to include not only the simple triangular wave phase modulation of FIGS. 4 and 5 but also the triangular stair-case phase modulation of FIG. 6, both of which produce rectangular wave modulation of $\Delta\Phi$ by providing up-slope and down-slope portions, on each of which time is spent.

OPERATING VALUES

Although specific phase difference values to which the system is locked were mentioned in this disclosure for the purpose of example, any two values where one is greater than the phase difference due to rotation and one is less than the phase difference due to rotation may be used. It is important only that these phase difference values be known to a high accuracy.

What is claimed is:

1. In a method of closed loop feedback phase locking of an optical loop gyroscope having counter propagating lightwaves therein, the steps of:
   combining said counter-propagating waves to produce an optical output signal having an amplitude which is a function of phase difference between the combined counter-propagated lightwaves and having a component responsive to rotation;
   detecting said rotation responsive component of said optical output signal;
   utilizing said detected rotation responsive component to generate a feedback signal providing up-slope and down-slope portions on each of which time is spent;
   phase modulating the counter-propagating lightwaves with the feedback signal;
   locking the phase difference of the combined counter-propagating waves alternately to at least two predetermined values which are respectively greater than and less than the phase difference due to rotation; and
   synchronizing the transitions between the locked values of phase difference to discrete time intervals provided by a clock signal having clock periods.

2. The method of claim 1 including the step of:
   deriving an output determinative of rotation including counting the clock periods that occur during the respective times spent on the locked values of phase difference.

3. The method of claim 2 wherein said step of deriving an output determinative of rotation also includes calculating the difference between the numbers of the clock periods that occur during the respective times spent on said two locked values.

4. The method of claim 1 wherein said predetermined values of phase difference to which the counter-propagating waves are locked are odd integral multiples of $\pi/2$ radians.

5. The method of claim 1 wherein said predetermined values of phase difference to which the counter-propagating waves are locked are integral multiples of $\pi$ radians.

6. The method of claim 1 wherein said predetermined values of phase difference to which the counter-propagating waves are locked are odd integral multiples of $\pi$ radians.

7. The method of claim 1 wherein the step of phase modulating the counter-propagating lightwaves with the feedback signal includes modulating the phase of the counter-propagating waves with phase shifts greater than 20 $\pi$ radians.

8. The method of claim 7 wherein the optical loop is defined by a fiber optic waveguide and the phase is modulated by stretching a portion of the fiber optic waveguide.

9. The method of claim 1 wherein the phase is modulated by modulating the lightwaves at a pair of positions symmetrically placed about the center of said optical loop with complementary feedback signals.

10. The method of claim 1 including the steps of: phase modulating the counter-propagating waves with a second signal of an amplitude less than that of said feedback signal and of a modulation frequency higher than that of the frequency of said feedback signal to produce a phase difference modulation output component in the combined optical output which is harmonically related to the modulation frequency of said second signal, and
   detecting the optical output component harmonically related to said second signal to detect small deviations from the phase difference values to which the phase difference is locked.

11. The method of claim 10 wherein the second phase modulation frequency $f_m$ is approximately equal to $(2n-1)/2T_L$ where n is a positive integer and $T_L$ is the lightwave propagation time around the optical loop.

12. The method of claim 11 where n is 2.

13. The method of claim 10 where the second signal is sinusoidal to produce sinusoidal phase difference modulation of the counter-propagating lightwaves.

14. The method of claim 10 where the second signal phase modulation is produced proximate one end of the optical loop.

15. The method of claim 10 wherein the phase difference modulation produced by the second signal has a peak amplitude less than $\pi/5$ radians.

16. The method of claim 10 wherein the phase difference modulation produced by the second signal has a peak amplitude less than $\pi/20$ radians.

17. The method of claim 10 including the step of synchronizing said clock signal to the second signal.

18. The method of claim 1 wherein the feedback signal is a triangular wave.

19. The method of claim 1 wherein the phase is modulated by modulating the lightwaves at a single position proximate one end of the loop.

20. The method of claim 2 wherein the derived output is determinative of rotation angle.

21. The method of claim 1 including the steps of:
   polarizing the counter-propagating lightwaves to have a common polarization prior to said phase modulation;
   and wherein the step of phase modulating the counter-propagating waves produces an accompanying modulation of the birefringence of the light path through the phase modulator; and
   aligning the principal axes of the birefringence modulation with the axes of said polarization of the counter-propagating lightwaves.

22. The method of claim 21 where the amplitude of the accompanying birefringence modulation is adjusted to be an integer multiple of a half wavelength of the counter-propagating lightwaves.

23. In a closed loop fiber optic gyroscope having an optical loop interferometer with counter-propagating lightwise therein, the combination comprising:
   combining means for combining said counter-propagating waves to produce an optical signal having an amplitude which is a function of phase difference between the combined counter-propagated lightwaves and having a component responsive to rotation;
   detecting means for detecting said rotation responsive component of said optical output signal;
   wave generator means responsive to said detected rotation responsive component to generate a feedback signal having up-slope and down-slope portions on each of which time is spent;
   phase modulating means for phase modulating the counter propagation lightwaves with said feedback signal to lock the phase difference of the combined counter-propagating waves alternately to two predetermined values which are respectively greater than and less than the phase difference due to rotation;

clock means for generating a clock signal having clock periods; and synchronizing means for synchronizing to said clock signals, the transition between said up-slope and down-slope portions of said feedback signal.

24. The gyroscope of claim 23 including:

derivation means for deriving an output determinative of rotation including a counter for counting the clock periods that occur during the respective times spent on the locked values of phase difference.

25. The gyroscope of claim 24 wherein said derivation means also includes means for calculating the difference between the number of clock periods that occur during the respective times spent on said two locked values.

26. The gyroscope of claim 23 wherein said predetermined values of phase difference to which the counter-propagating waves are locked are odd integral multiples of $\pi/2$ radians.

27. The gyroscope of claim 23 wherein said predetermined values of phase difference to which the counter-propagating waves are locked are integral multiples of $\pi$ radians.

28. The gyroscope of claim 23 wherein said predetermined values of phase difference to which the counter-propagating waves are locked are odd integral multiples of $\pi$ radians.

29. The gyroscope of claim 23 wherein said phase modulating means modulates the phase of the counter-propagating waves with phase shifts greater than $20\pi$ radians.

30. The gyroscope of claim 29 wherein the optical loop is defined by a fiber optic waveguide; and wherein said phase modulator means modulates the phase by stretching a portion of the fiber optic waveguide.

31. The gyroscope of claim 23 wherein said phase modulator means includes a pair of phase modulator portions symmetrically placed about the center of said optical loop, wherein said wave generator means generates a pair of complementary feedback signals, and wherein said pair of phase modulator portions are responsive to the complementary feedback signals for modulating the phase of the counter-propagating lightwaves.

32. The gyroscope of claim 23 including:

dynamic bias signal generating means for generating a second signal of an amplitude less than that of said feedback signal and of a frequency higher than that of the frequency of said feedback signal;

phase modulating means responsive to said second signal for modulating the phase of the counter-propagating lightwaves to produce a phase difference modulation output component in the combined optical output which is harmonically related to the modulation frequency of said second signal; and detector means for detecting the optical output component harmonically related to said second signal to detect small deviations from the phase difference values to which the phase difference is locked.

33. The gyroscope of claim 32 wherein the frequency of the second signal $f_m$ is approximately equal to $(2n-1)/2T_L$ where n is a positive integer and $T_L$ is the lightwave propagation time around said optical loop.

34. The gyroscope of claim 33 where n is 2.

35. The gyroscope of claim 32 wherein the second signal is sinusoidal to produce sinusoidal phase difference modulation of the counter-propagating lightwaves.

36. The gyroscope of claim 23 wherein said phase modulating means is disposed proximate one end of the optical loop.

37. The gyroscope of claim 32 wherein the second signal amplitude is such that the phase difference modulation produced by said second signal has a peak amplitude less than $\pi/5$ radians.

38. The gyroscope of claim 32 wherein the second signal has a peak value such that the phase difference modulation produced by said second signal has a peak amplitude less than $\pi 20$ radians.

39. The gyroscope of claim 32 including:

synchronizing means for synchronizing said clock signal to the second signal.

40. The gyroscope of claim 24 wherein the derived output is determinative of rotation angle.

41. The gyroscope of claim 23 including:

light polarizing means for linearly polarizing the counter-propagating lightwaves within the optical loop;

said phase modulating means producing an accompanying modulation of the birefringence of the light path through said phase modulator means; and aligning means for aligning the principal axes of said birefringence modulation with the axes of said polarization of said counter-propagating lightwaves.

42. The method of claim 2 including:

counting the fringes of the optical output signal during the transitions between the two locked values of phase difference; and determining from the number of counted fringes the scaling factors of said time spent locked on respective values of phase difference to derive an output determinative of rotation.

43. The gyroscope of claim 24 including:

fringe counting means for counting the fringes of said optical output signal during the transitions between the two locked values of phase difference; and scaling factor means responsive to the number of said fringes counted to derive scaling factors for said time spent locked on respective values of phase difference to derive an output determinative of rotation.

44. The gyroscope of claim 23 wherein the feedback signal generated by said wave generator means is a triangular wave.

* * * * *